United States Patent [19]

Palaniswami

[11] Patent Number: 5,633,814
[45] Date of Patent: May 27, 1997

[54] NON-MODULO POWER OF 2 FREQUENCY DIVIDER

[75] Inventor: Krishnan Palaniswami, Austin, Tex.

[73] Assignee: Advanced Micro Devices, Sunnyvale, Calif.

[21] Appl. No.: 548,676

[22] Filed: Oct. 26, 1995

[51] Int. Cl.$^6$ .............................. G06F 7/52; H03K 21/00
[52] U.S. Cl. ................................... 364/703; 377/47
[58] Field of Search ............... 364/703; 377/47; 327/113, 117

[56] References Cited

U.S. PATENT DOCUMENTS

| | | | |
|---|---|---|---|
| 3,230,352 | 1/1966 | Grondin et al. | 364/703 |
| 3,873,815 | 3/1975 | Summers | 364/703 |
| 4,078,203 | 3/1978 | Borst | 364/703 |
| 5,390,223 | 2/1995 | Lindholm | 377/47 |

*Primary Examiner*—Tan V. Mai
*Attorney, Agent, or Firm*—H. Dale Langley, Jr.

[57] ABSTRACT

A frequency divider/counter circuit utilizing at clock and a clear signal to divide the clock by an odd value. A first adder receives the clock and the clear signal, and has a carry-in input, and generates an adder output and carry-out output. A second adder also receives the clock and the first adder cell carry-out output, and generates an adder output. A reset cell receives the clock and the clear signal, and has an input and generates a reset output. Logic receives selected adder outputs and generates a divider output when the odd value is reached, wherein the first adder receives the divider output as its carry-in input, the second adder receives the carry-out output of the first adder as its carry-in input and the reset output as its clear input, and the reset cell receives the divider output as its input. The clear signal causes the frequency divider/counter to clear the outputs of the first and second adders, and, in the absence of the clear signal, generates a divider output when the adder outputs of the first and second adders represent the odd value upon which the adder output of the second adder clears. The frequency divider/counter circuit may also count an even value in which the carry-in input of the first adder is connected to ground, and, upon reaching the desired count, resets the outputs of both the first and second adders.

12 Claims, 4 Drawing Sheets

NON-MODULO POWER OF 2 FREQUENCY DIVIDER

BACKGROUND OF THE INVENTION

The present invention relates to electrical circuits and, more particularly, to a frequency divider/counter for use in non-modulo power of 2 applications.

In certain electrical applications, particularly in digital electronic circuits, it is often desirable to step down the frequency of a clock signal by the use of a frequency divider in order to use the stepped-down clock to control certain actions. Similarly, it is often desirable to count a given number of signals on a line over time by the use of a counter to trigger additional actions following the passage of that number of signals. While two separate names, frequency divider and counter, are used for the circuitry which performs the above application, the circuitry required to perform these applications is identical. The only difference being that instead of using a clock signal as an input to the circuitry, the line containing the signals to be counted is used as the input.

When the frequency step-down rate or the count is not equal to $2^N$, in other words, is a non-modulo power of 2, circuit designers have used complex circuitry to generate the desired output. Not only has the circuitry been complex, but the complexity has also resulted in irregular circuitry layouts. This has particularly been the case where the frequency divider/counter is fabricated within standard CMOS integrated circuits.

Therefore, what is needed is a non-modulo power of 2 frequency divider/counter which utilizes standard CMOS technology and provides for simpler construction and easier layout.

SUMMARY OF THE INVENTION

The present invention, accordingly, provides a frequency divider/counter circuit utilizing at clock and a clear signal to divide the clock by an odd value. A first adder receives the clock and the clear signal, and has a carry-in input, and generates an adder output and carry-out output. A second adder also receives the clock and the first adder cell carry-out output, and generates an adder output. A reset cell receives the clock and the clear signal, and has an input and generates a reset output. Logic receives selected adder outputs and generates a divider output when the odd value is reached, wherein the first adder receives the divider output as its carry-in input, the second adder receives the carry-out output of the first adder as its carry-in input and the reset output as its clear input, and the reset cell receives the divider output as its input. The clear signal causes the frequency divider/counter to clear the outputs of the first and second adders, and, in the absence of the clear signal, generates a divider output when the adder outputs of the first and second adders represent the odd value upon which the adder output of the second adder clears.

The frequency divider/counter circuit may also count an even value in which the carry-in input of the first adder is connected to ground, and, upon reaching the desired count, resets the outputs of both the first and second adders.

DESCRIPTION OF THE PREFERRED EMBODIMENTS

Figure 1:
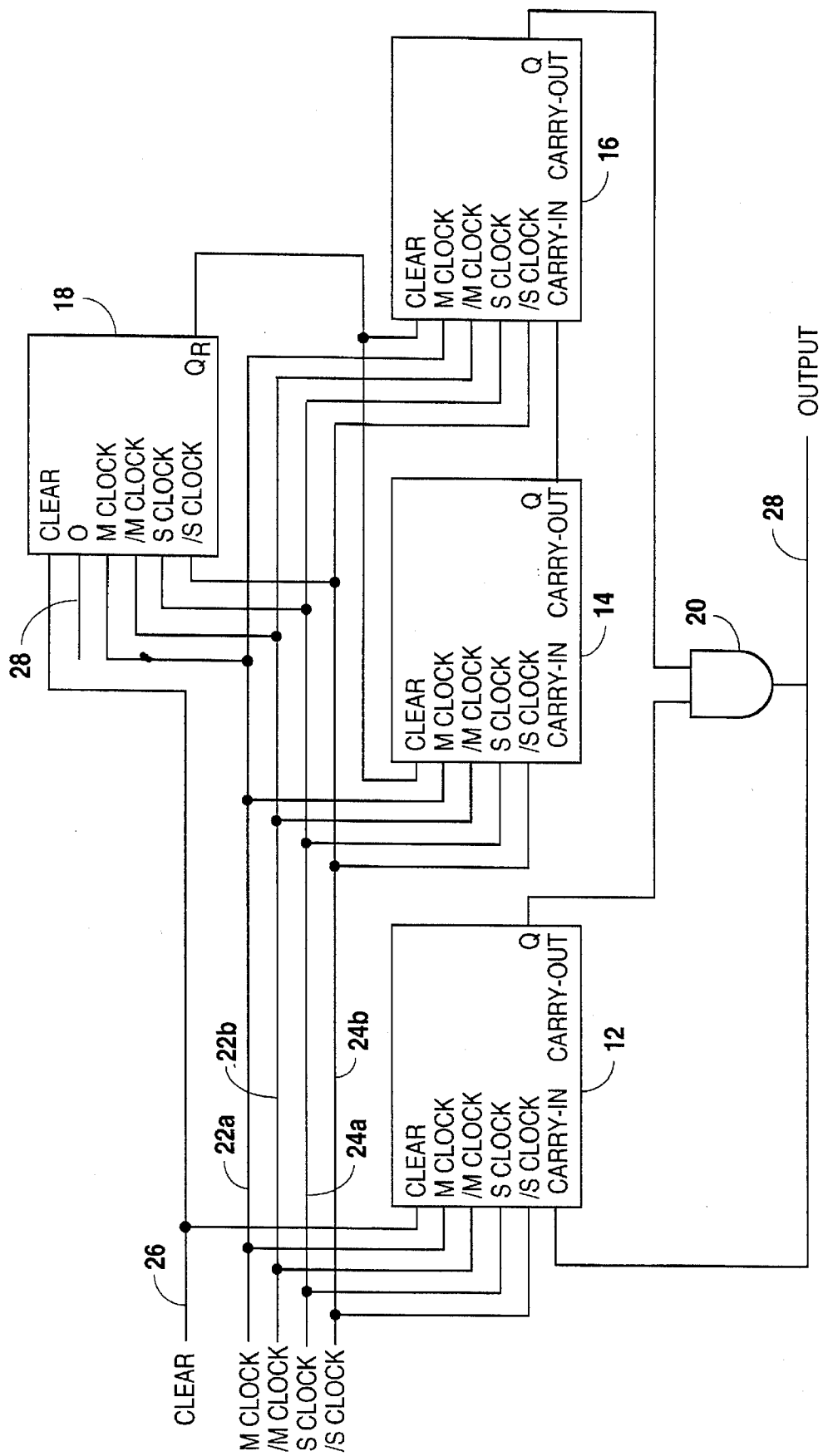
FIG. 1 is a schematic diagram of a frequency divider/counter in accordance with the present invention designed for division by an odd number.

Referring to FIG. 1, the reference numeral 10 refers in general to a non-modulo power of 2 frequency divider/counter designed to divide/count by the odd number 5 in accordance with the present invention. The frequency divider/counter 10 is comprised of 3 1-bit adder cells 12, 14 and 16, a reset cell 18 and an AND gate 20. The 1-bit adder cells each have a clear, mclock, /mclock, sclock, /sclock and carry-in inputs, and a Q and a carry-out output. As used herein, a "/" before a signal indicates the inverse, or active low version, of a signal. The reset cell 18 has an O, clear, mclock, /mclock, sclock and /sclock inputs and a $Q_R$ output.

The frequency divider/counter 10 utilizes five external signals mclock 22a, /mclock 22b, sclock 24a, /sclock 24b and clear 26 which are generated by other components which are not shown. The mclock 22a and sclock 24a signals are non-overlapping clocks and are used as will be described below.

As shown in FIG. 1, the mclock 22a, /mclock 22b, sclock 24a and/sclock 24b signals are connected to the mclock, /mclock, sclock and/sclock inputs, respectively, of each of the adder cells 12, 14 and 16 and the reset cell clear 18. The clear signal 26 is only connected to the clear inputs of adder cell 12 and reset cell 26. The output $Q_R$ of the reset cell 26 is connected to the clear inputs of the remaining adder cells 14 and 16.

The Q outputs of the adder cells 12 and 16 are used as the inputs to the AND gate 20 to indicate the odd count 5 (binary 101). The Q outputs of the adder cell 14 is not utilized in the divide by 5 application shown. The output of the AND gate 20 is the resultant output signal 28 of the frequency divider/counter 10, and is additionally connected to the carry-in input of the adder cell 12 and to the 0 input of the reset cell 18.

The carry-in input of the remaining adder cells 14 and 16 are each connected to the carry-out output of the preceding adder cell 12 and 14, respectively.

It is understood that the final adder cell in the sequence does not require a carry-out signal which permits the omission of the carry-out circuitry, as will be described, from the final adder cell.

Figure 2:
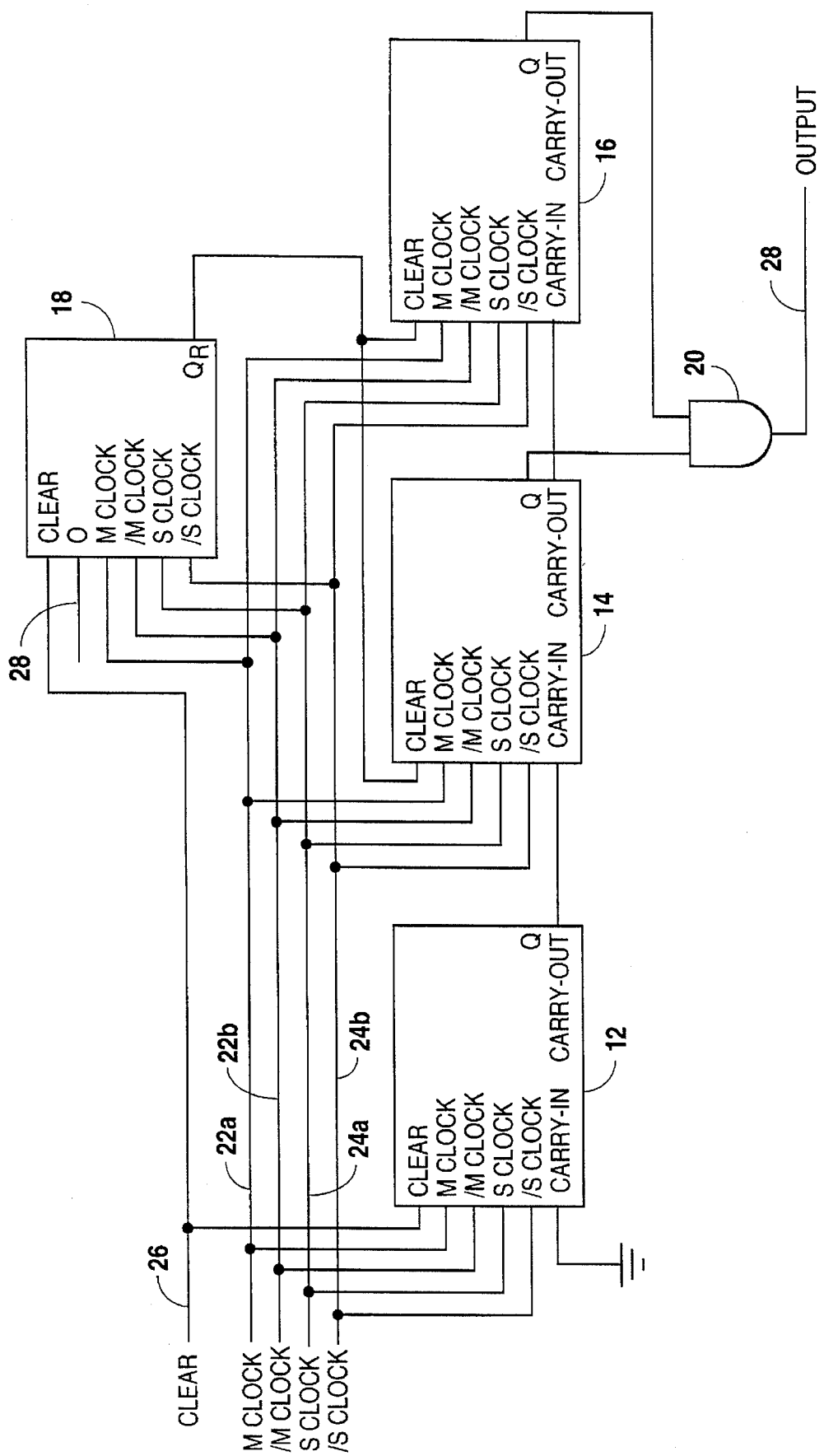
FIG. 2 is a schematic diagram of a frequency divider/counter in accordance with the present invention designed for division by an even number.

In FIG. 2 a second non-modulo power of 2 frequency divider/counter 30 is shown which is designed to divide/count by the even number 6 (binary 110). Because of the similarity between the frequency divider/counter 10 shown in FIG. 1 and the frequency divider/counter 30 shown in FIG. 2, identical numbers are used to indicated similar components. In the divide by even number frequency divider/counter 30 shown in FIG. 2, the carry-in input of the adder cell 12 is connected to Found instead of the output signal 28. Further, since the frequency divider/counter 30 shown in FIG. 2 divides by 6, the Q outputs of the adder cells 14 and 16 are used as the inputs to the AND gate 20 to generate the output signal 28.

Figure 3:
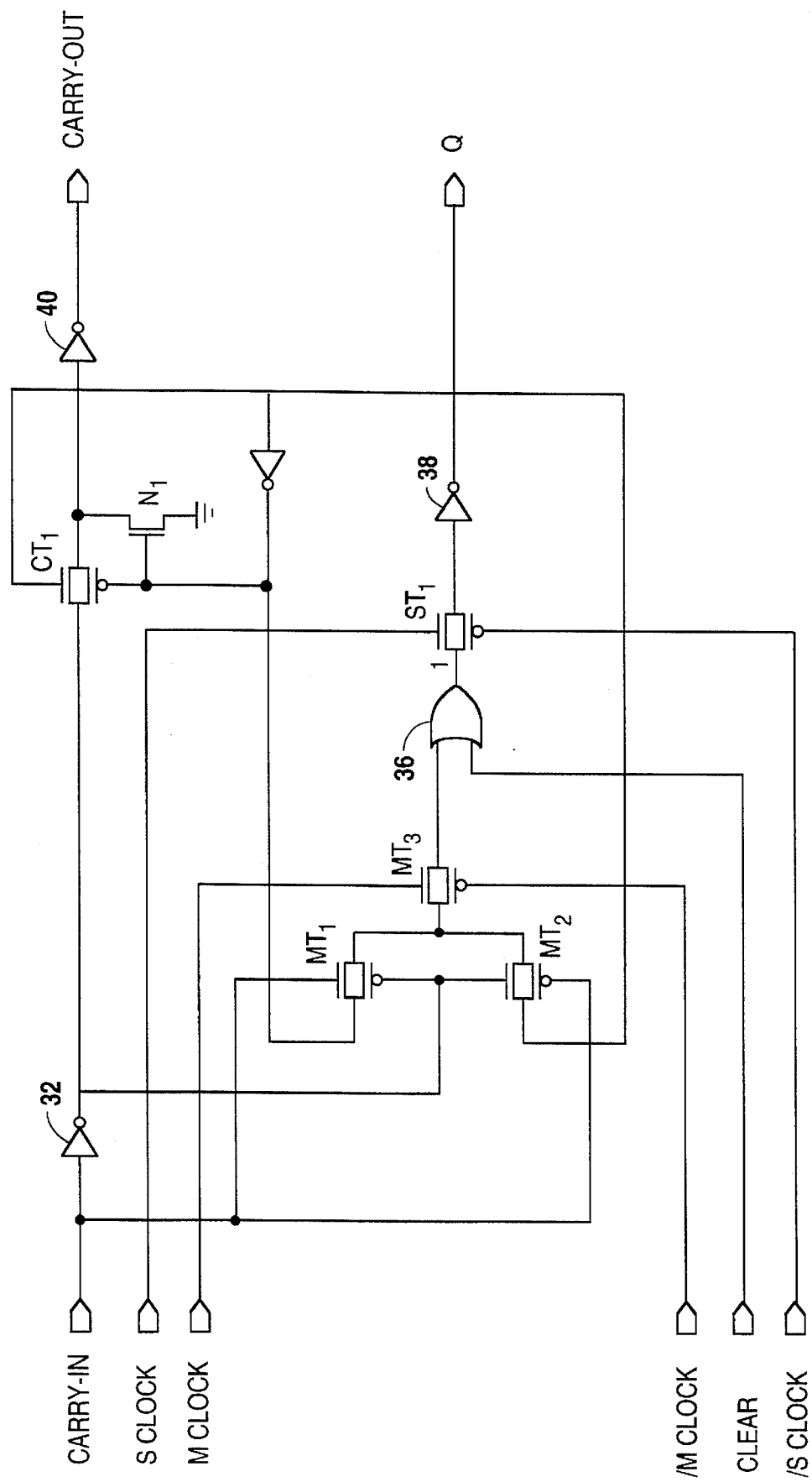
FIG. 3 is a detailed schematic diagram of a 1-bit adder cell shown in FIGS. 1 and 2.

Referring now to FIG. 3, a detailed schematic of the adder cells 12, 14 and 16 is shown. The adder cells 12, 14 and 16 are each comprised of an inverter gate 32 connected to the carry-in input. The carry-in input is connected to the n-channel portion of transmission gates $MT_1$, and $MT_2$, while the p-channel portion of the transmission gates $MT_1$ and $MT_2$ are connected to the inverted value of the carry-in input through inverter 30. The mclock input is similarly connected to the n-channel side of a transmission gate $MT_3$, with the/mclock input being connected to the p-channel side of the transmission gate $MT_3$. The output of the transmission gates $_1MT$ and $_2MT$ are both connected to the input of the transmission gate $MT_3$. The input to the transmission gate $MT_1$ is connected to the inverted value of the output Q through an inverter 34, while the input to the transmission gate $MT_2$ is connected to the output Q.

The output of the transmission gate $MT_3$ is connected to the input of an OR gate 36, with the other input of the OR gate 36 connected to the clear input. The output of the OR gate 36 is connected to the input of a transmission gate $ST_1$. The output of the transmission gate $ST_1$ is connected to an inverter 38 whose output is the Q output of the adder cell. The sclock input is connected to the n-channel side of the transmission gate $ST_1$ with the /sclock input being connected to the p-channel side of the transmission gate $ST_1$.

The output of the inverter 32 is connected to the input of a transmission gate $CT_1$. The n-channel side of the transmission gate $CT_1$ is connected to the Q output, with the p-channel side of the transmission gate $CT_1$ connected to the inverted value of the Q output through the inverter 34. The output of transmission gate $CT_1$ is connected to the input of an inverter 40 which generates the carry-out output. Additionally, the input to the inverter 40 is connected to the source of an n-channel field effect transistor (FET) $N_1$. The drain of the FET $N_1$ is connected to ground with the gate being connected to the inverted value of the Q output through the inverter 34.

In operation the adder cell may be cleared by asserting an active, or high, signal on the clear input. As shown in FIG. 3, when the clear input is active, or high, the output of the OR gate 36 is forced high which presents a high signal at the input of the transmission gate $ST_1$. When the sclock input is active, or high, and the/sclock input is active, or low, the transmission gate $ST_1$ passes a high signal to the inverter 38 which forces the Q output low. With the Q output low, the transmission gate $CT_1$ turns off and the FET $N_1$, turns on which forces the carry-out output high through the inverter 40.

In normal operation the clear input is normally inactive, or low, and the Q output is derived from the carry-in input and the previous state of the Q output, as will be described. With the carry-in input high, the transmission gate $MT_1$ is turned on (turning off the transmission gate $MT_2$) which passes the inverted value of the prior Q output through to the input of the transmission gate $MT_3$. However, when the carry-in input is low, the transmission gate $MT_1$ turns off and the transmission gate $M_2T$ turns on passing through the prior value of the Q output through to the input of the transmission gate $MT_3$. When the mclock input becomes active, or high, and the/mclock input becomes active, or low, the transmission gate $MT_3$ turns on and passes its input through to the input of the OR gate 36.

With the clear input inactive, or low, the OR gate 36 passes the output of the transmission gate $MT_3$ through to the input of the transmission gate $ST_1$. When the sclock input becomes active, or high, and the/sclock input becomes active, or low, the transmission gate $ST_1$ turns on and passes its input through to the input of the inverter 38 to generate the Q output.

The following is a state table for the Q output of the adder cell as described above, where Q' is the previous state of the Q output before the mclock and sclock inputs toggle.

| carry-in | clear | Q' | Q |
|---|---|---|---|
| 1 | 0 | 0 | 0 |
| 1 | 0 | 1 | 1 |
| 0 | 0 | 0 | 1 |
| 0 | 0 | 1 | 0 |
| x | 1 | x | 0 |

The carry-out output is similarly created. When the Q output is low, as described above in connection with the clear operation, the carry-out output becomes active, or high. However, when the Q output is active, or high, the transmission gate $CT_1$ turns on and passes the inverted value of the carry-in signal from the inverter 32 to the input of the inverter 40, which effectively passes the carry-in signal through to the carry-out output.

The following table shows the value of the carry-out output of the adder cell which is based on the current state of the Q output and the carry-in input.

| carry-in | clear | Q | carry out |
|---|---|---|---|
| 1 | 0 | 0 | 1 |
| 0 | 0 | 0 | 1 |
| 1 | 0 | 1 | 1 |
| 0 | 0 | 1 | 0 |
| x | 1 | x | 1 |

Figure 4:
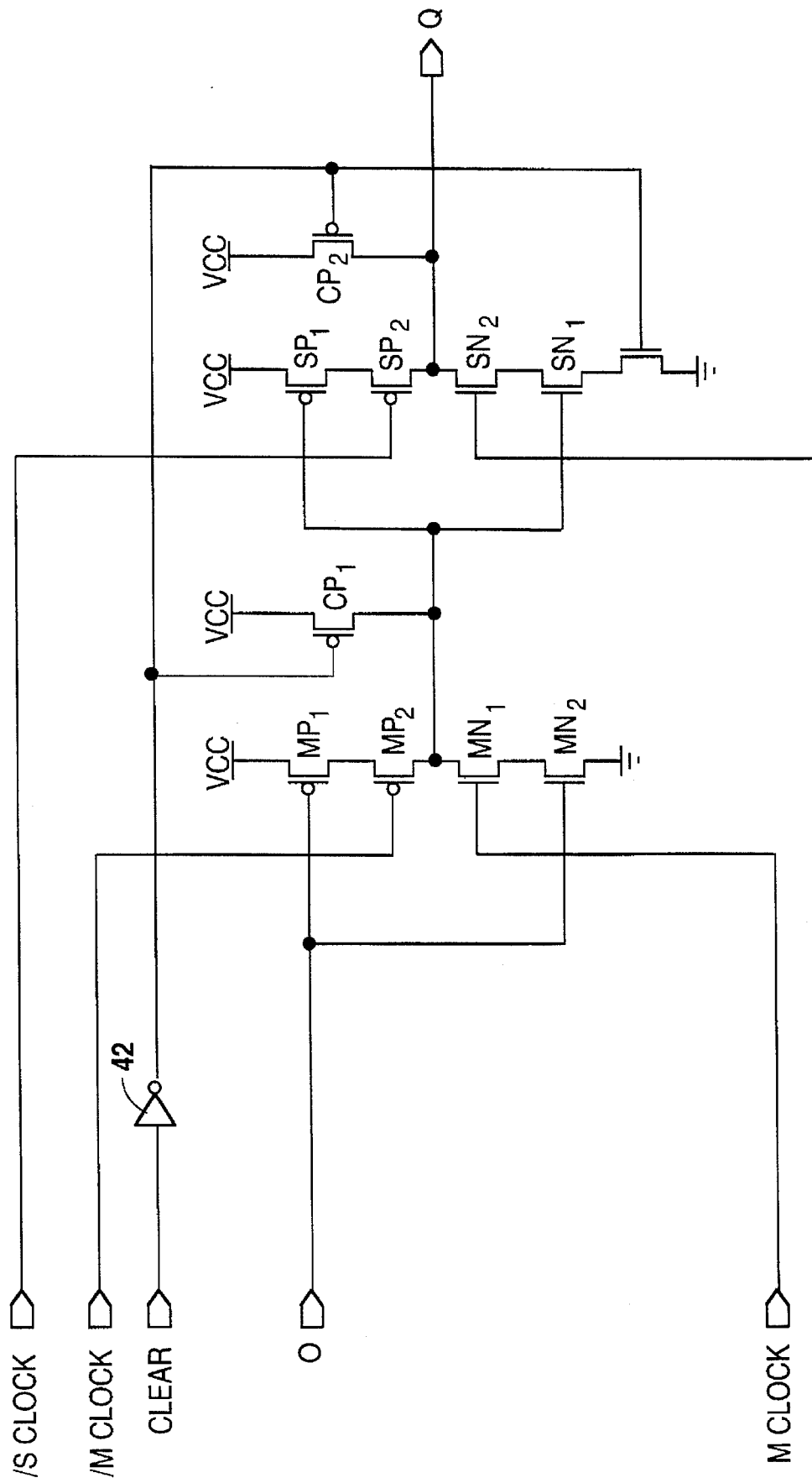
FIG. 4 is a detailed schematic diagram of the reset cell shown in FIGS. 1 and 2.

Referring now to FIG. 4, a detailed schematic of the reset cell 18 is shown. The O input of the reset cell 18 is connected to the gates of a p-channel FET $MP_1$ and an n-channel FET $MN_1$. The source of the FET $M_1P$ is connected to $V_{cc}$ and the drain is connected to the source of a p-channel FET $MP_2$. Similarly, the drain of the FET $M_1 N$ is connected to ground and the source is connected to the drain of a n-channel FET $MN_2$. The gates of the FETs $MP_2$ and $MN_2$ are connected to the/inclock and mclock inputs, respectively. The source of the FET $MN_2$ and drain of the FET $MP_2$ are each connected to the drain of a p-channel FET $CP_1$, and to the gate of a p-channel FET $SP_1$ and the gate of a n-channel FET $SN_1$. The gate of the FET $C_1 P$ is tied to the inverted value of the clear input through an inverter 42, and the source of the FET $CP_1$ is connected to $V_{cc}$. The source of the $FET_1$ SP is connected to $V_{cc}$ with the drain connected to the source of a p-channel FET $SP_2$. The source of the FET $SN_1$ is connected to the drain of a n-channel FET $SN_2$. The drain of the FET $SP_2$ and the source of the FET $SN_2$ generate the $Q_R$ output of the reset cell 18.

The $Q_R$ output is also connected to the drain of a p-channel FET $C_2P$. The source of the FET $CP_2$ is connected to $V_{cc}$ and the gate is connected to the inverted value of the clear input through the inverter 42. Additionally, the inverted value of the clear input through the inverter 40 is connected to the gate of a n-channel FET $CN_1$. The drain of the FET $CN_1$ is connected to ground and the source is connected to the drain of the FET $SN_1$.

It is understood that the adder cell relies on inherent capacitance to hold the level at the gates of the FET $SP_1$ and the FET $SN_1$, as well as on the Q output. Accordingly, the adder cell must be operated at a sufficient frequency such that the charge stored by this inherent capacitance does not discharge before the next series of clock pulses.

In operation the reset cell 18 may be cleared by asserting an active, or high, signal on the clear input. As shown in FIG.

4, when the clear input is active, or high, the output of the inverter 40 turns on the FETs $CP_1$ and $CP_2$ which forces the Q output to an active, or high, state.

In normal operation the clear input is normally inactive, or low, and the FETs $CP_1$ and $CP_2$ are turned off, the FET $CN_1$ is turned on and the $Q_R$ output is derived from the O input. If the input O is low, the FET $MP_1$ is turned on which passes $V_{cc}$ through to the FET $MP_2$, and the FET $M_1N$ is turned off. Conversely, if the O input is high, the FET $MP_1$ is turned off and the FET $MP_2$ is turned on which passes a low signal through to the FET $MN_2$. When the mclock input goes active, or high, and the/mclock input goes active, or low, the FET's $MP_2$ and $MN_2$ turn on. If the FET $MP_1$ is turned on, then a high signal is passed through the FET $MP_2$ to the gates of the FETs $SP_1$ and $SN_1$ turning on the FET $SP_1$. If, however, the FET $MN_1$ is turned on, then a low signal is passed through the FET $MN_2$ to the gates of the FETs $SP_1$ and $SN_1$ turning on the FET $SN_1$.

When the sclock input becomes active, or high, and the/sclock input becomes active, or low, the FETs $SP_2$ and $SN_2$ turn on and pass either a high signal to the Q output, if the FET $SP_1$ is turned on, or a low signal to the Q output if the FET $SN_1$ is turned on. In essence, the value at the O input is passed through to the Q output following an mclock pulse and a sclock pulse.

With an understanding of the operation of the adder cells 12, 14 and 16 and the reset cell 18, the operation of the frequency divider/counter 10 will now be described. Initially, a clear signal is initiated which sets the Q outputs of the adders 12, 14 and 16 to a low value, which in turn sets the output signal 28 to a low value. Once the clear input has been released, the reset cell 18 holds the clear inputs to the adder cells 14 and 16 high until the end of the next inclock 22a and sclock 24a cycle, or $cycle_{000}$. It is understood that for an odd value counter, the state where all the Q outputs of the adder cells 12, 14 and 16 are simultaneously low only occurs during a clear operation. In the next sclock 24a pulse, $cycle_{100}$, the adder cell 12 begins counting with a low value on its carry-in input and changes to a high Q output and a low carry-out level.

In $cycle_{010}$, the adder cell 12 changes to a low Q output and a high carry-out output. The adder cell 14 then changes to high Q output and a high carry-out output. The adder cell 16 remains at a low Q output and a high carry-out output.

In $cycle_{110}$, the adder cell 12 changes to a high Q output and a low carry-out output. The adder cell 14 retains a high Q output and its carry-out output falls to a low level. The adder cell 16 remains at a low Q output and a high carry-out output.

In $cycle_{001}$, the adder cell 12 changes to a low Q output and a high carry-out output. The adder cell 14 changes to a low Q output and its carry-out output returns to a high level. The Q output of the adder cell 16 then changes to a high level and its carry-out output remains high.

In $cycle_{101}$, the adder cell 12 changes to a high Q output and a low carry-out output. The adder cell 14 retains a low Q output and its carry-out output retains a high level. The adder cell 16 remains at a high Q output and a high carry-out output.

Once the frequency divider/counter 10 has reached the state where the Q outputs of adder cells 12 and 16 are high, the AND gate 20 generates a high output signal 28 indicating that five cycles have been counted. With a high output signal 28 used as the input of the reset cell 18 and the carry-in input of the adder cell 12, the next clock cycle cause the frequency divider/counter 10 to reset and begin counting from $cycle_{100}$.

Since the divider/counter 10 is an odd value counter, the output will only cycle high when the adder cell 12 has a Q output of 1. Accordingly, by using the output signal 28 as the carry-in input, after the desired odd value count has been reached, the adder cell 12 will start at a high Q output and a high carry-out output, so that the frequency divider/counter 10 can begin counting from 1.

The operation of the frequency divider/counter of an even case operates in a similar manner, except that after reaching the desired count, and the output of the AND gate 20 goes high, the frequency divider/counter 30 resets to $cycle_{000}$.

It is understood that the frequency divider/counters 10 and 30 may be easily scaled to account for higher divider/counter values through the addition or removal of additional adder cells. All additional adder cells would be connected in the same fashion as are the adder cells 14 and 16. The present invention has several advantages. For example, the frequency divider/counter only utilizes 1-bit adder cells, one reset cell and one AND gate. Further, the counter is easily scaled by the addition or removal of 1-bit adder cells.

It is understood that several variations may be made in the foregoing without departing from the scope of the invention. For example, the polarity of the logic which is used may be reversed, other clock signals may be utilized, the construction of the adder cells and the reset cell may be modified in any manner as long as they provide the same functionality. Additionally, while the invention described above is designed for use in a CMOS integrated circuit, the circuitry may by used in any other medium or mode of manufacture.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A frequency divider circuit utilizing at least one clock signal and a clear signal, wherein the divider circuit divides the at least one clock signal by an odd value, the divider comprising:

a first adder for receiving the at least one clock signal and the clear signal, and having a carry-in input, and generating an adder output and carry-out output;

a second adder for receiving the at least one clock signal and the first adder cell carry-out output, and having a carry-in input and a clear input, and generating an adder output;

a reset cell for receiving the at least one clock signal and the clear signal, and having an input and generating a reset output; and logic for receiving selected adder outputs and generating a divider output when the odd value is reached;

wherein the first adder receives the divider output as its carry-in input, the second adder receives the carry-out output of the first adder as its carry-in input and the reset output as its clear input, and the reset cell receives the divider output as its input, wherein the clear signal causes the frequency divider to set the outputs of the first and second adders to a first state, and, in the absence of the clear signal, the frequency divider generates a divider output when the adder outputs of the first and second adders represent the odd value thereby setting the adder outputs of the first and second adders to a second state.

2. The frequency divider circuit of claim 1, wherein the at least one clock signal comprises at least two non-overlapping clock signals.

3. The frequency divider circuit of claim 1, wherein the adder output of the first adder toggles with each clock pulse, and the adder output of the second adder toggles with every other clock pulse.

4. The frequency divider circuit of claim 1, comprises a third adder for receiving receive signals from the second adder as the second adder received signals from the first adder.

5. The frequency divider circuit of claim 1, wherein the circuit is utilized as a counter.

6. The frequency divider/counter circuit of claim 1, wherein the circuit is fabricated as a CMOS integrated circuit.

7. A frequency divider circuit utilizing at least one clock signal and a clear signal, wherein the divider circuit divides the at least one clock signal by an even value, the divider comprising:

a first adder for receiving the at least one clock signal and the clear signal and generating an adder output and carry-out output;

a second adder for receiving the at least one clock and the first adder cell carry-out output, and having a carry-in input and a clear input, and generating an adder output;

a reset cell for receiving the at least one clock signal and the clear signal, and having an input and generating a reset output; and logic for receiving selected adder outputs and generating a divider output when the odd value is reached;

wherein the second adder receives the carry-out output of the first adder as its carry-in input and the reset output as its clear input, and the reset cell receives the divider output as its input, wherein the clear signal causes the frequency divider to set the outputs of the first and second adders to a first state, and, in the absence of the clear signal, the frequency divider generates a divider output when the adder outputs of the first and second adders represent the even value thereby setting the adder outputs of the first and second adders clear to the first state.

8. The frequency divider circuit of claim 7, wherein the at least one clock signal comprises at least two non-overlapping clock signals.

9. The frequency divider circuit of claim 7, wherein the adder output of the first adder toggles with each clock pulse, and the adder output of the second adder toggles with every other clock pulse.

10. The frequency divider circuit of claim 7, comprising a third adder for receiving signals from the second adder as the second adder received signals from the first adder.

11. The frequency divider circuit of claim 7, wherein the circuit is utilized as a counter.

12. The frequency divider/counter circuit of claim 7, wherein the circuit is fabricated in a CMOS integrated circuit.

* * * * *

UNITED STATES PATENT AND TRADEMARK OFFICE
CERTIFICATE OF CORRECTION

PATENT NO.   : 5,633,814
DATED        : May 27, 1997
INVENTOR(S)  : Palaniswami

It is certified that error appears in the above-identified patent and that said Letters Patent is hereby corrected as shown below:

Column 3,
Lines 38 and 61, "the/sclock", should read -- the /sclock".

Column 4,
Line 34, "$M_1P$", should read -- $MP_1$ --.
Line 39, "the/inclock", should read -- the /mclock --.

Column 5,
Line 12, "the/mclock", should read -- the /mclock --.
Line 19, "the/sclock", should read -- the /sclock --.
Line 32, "inclock", should read -- mclock --.

Signed and Sealed this

Seventh Day of May, 2002

Attest:

JAMES E. ROGAN
Attesting Officer    Director of the United States Patent and Trademark Office